Nov. 3, 1964   H. R. GATES   3,155,064
FUSION MOLD FIXTURE ASSEMBLY
Filed Nov. 15, 1961
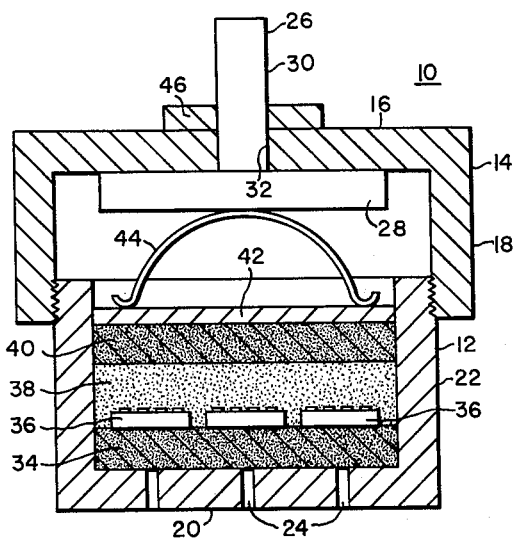
WITNESSES
Edwin E. Bassler
Charles L. Menzemer
INVENTOR
Harlan R. Gates
BY
Frederick Hope
ATTORNEY United States Patent Office 3,155,064
Patented Nov. 3, 1964

3,155,064
FUSION MOLD FIXTURE ASSEMBLY
Harlan R. Gates, Millbrook, N.Y., assignor to Westinghouse Electric Corporation, East Pittsburgh, Pa., a corporation of Pennsylvania
Filed Nov. 15, 1961, Ser. No. 152,390
3 Claims. (Cl. 113—99)

This invention relates in general to semiconductor devices and more particularly to a fixture assembly suitable for use in joining by alloying or diffusion the separate components of a semiconductor device into a unitary body.

In the production of semiconductor devices having one or more planar junctions by the alloying method, a uniform wetting of the planar junction areas is necessary in order to obtain an alloyed layer of uniform thickness. Such uniform wetting is difficult to obtain and several techniques have heretofore been proposed to overcome this difficulty. One method of overcoming this difficulty is to place the component of the semiconductor device having planar surfaces in contiguous relation and then exerting a mechanical pressure upon the components by means of a press whose contact surface is planar and parallel to the surface areas of the components to be alloyed. This method generally has been found to be unsatisfactory primarily because when the surfaces to be joined are liquified, they tend to become laterally displaced.

Another widely used techniques provides for the use of a rigid mold which is adapted to conform to the particular configuration of the semiconductor device. Such a rigid mold is effective in eliminating the lateral displacement of the components to be joined during the fusion thereof but such molds are difficult to manufacture particularly where the device to be formed has a complicated shape. Also a considerable stock of molds would be required to accommodate all the different varieties of devices made in a given plant.

It has been found that most of the various difficulties encountered by the above-mentioned techniques can be eliminated by embedding the assembled components in a comminuted material which does not react with the components and compressing the comminuted material to form a mold which adapts itself to the assembly embedded therein. The resultant body thus produced comprises a compressed pellet or carrier body consisting of one or more of the assembled component units to be joined embedded in a compacted comminuted material, which latter forms a fusion mold, which body can readily be transferred to a fusion furnace and heated to complete the alloying process. It is necessary that the fusion mold forming material be inert so as not to react with any of the semiconductor components to be joined. Graphite, magnesium oxide, aluminum oxide and other ceramic or refractory or high melting pulverant materials have been found satisfactory for this purpose.

After the assembled components have been properly arranged and embedded in the comminuted material to form a pellet or carrier body, a plurality of such pellets or carrier bodies are loaded into a tube of suitable length to be transferred to the heating furnace. The tube may consist of any suitable material such as quartz or a ceramic material. The subsequent heating of the carrier bodies is usually performed in a vacuum or an inert gas atmosphere although in some instances depending on the semiconductor and mold materials, heating may be performed in the ordinary atmosphere.

In forming a fusion mold of the type mentioned, the assembled components of the semi-conductor device are placed on a compressed disk of comminuted material, preferably of graphite, often with a film of oil to hold them in place, and either a second soft disk of the same material or a measured quantity of powdered graphite is placed over the positioned components. The second disk is moderately compressed just so that it holds together and is "soft" so that it readily deforms or crumbles under moderate pressure. Pressure is then applied to deform and join the superimposed graphite and bottom disks thus embedding the positioned components therebetween.

At the time when the initial compressive load is applied to compact the comminuted material to the lower disk the adjoining surface areas of the components are in the desired contiguous relation. However, after the load has been released, the inherent resiliency of the comminuted material causes the material to relax and expand and at times may cause the positioned semiconductor components to separate slightly. For most applications, this slight separation caused by the relaxation of the comminuted material, which is of the order of 1 mil, is not significant and will not appreciably affect the formation of the alloyed layer between the components. However, where planar fusions of small narrow foils to larger planar surfaces is desired, the results have been less satisfactory. This separation has been especially significant, as for example, in the production of high frequency power transistors where foils as small as .004 inch in width must be fused consistently to concise predetermined depths in adjoining planar surfaces of greater area, with flat even wetting. It is necessary in the fusion of such relatively small foils to larger surfaces that the foils make complete contact with the larger surfaces as the thin film of oil normally present between the adjoining surfaces is driven out during the first part of the fusion cycle. The ordinary pressure fusion molds utilizing initial pressures up to 600 p.s.i. have not proved entirely satisfactory in providing the desired full surface contact in such instances.

Normally an external pressure in the form of weights or springs is applied to the carrier bodies loaded in a heating tube to compensate for the inherent relaxation of the compacted comminuted material and to compensate further for the space created by the evaporation of the thin oil film present between the adjoining surfaces of the assembled components. This inherent relaxation in the ordinary fusion mold as heretofore described is not sufficiently compensated for by such weights or springs, so that the basic difficulty with respect to the separation of the contact surfaces resulting in the nonuniform wetting of the adjoining component surfaces and the lateral displacement of the component parts still remains.

Accordingly, it is the general object of this invention to provide a fixture assembly for maintaining pressure during mold fusion of the separate components of a semiconductor device into a unitary body.

Another object of this invention is to provide a mold fusion fixture assembly adapted for joining by alloying the separate components of a semiconductor device into a unitary body wherein the components are retained in predetermined uniform contiguous relation during the fusion cycle.

A further object of this invention is to provide a mold fusion fixture assembly adapted for joining by alloying the separate components of a semiconductor device embedded in a relatively inert, comminuted material wherein a constant compressive load is applied to the components to be joined during the entire fusion cycle to provide a uniform wetting of planar surface areas to be joined to obtain an alloyed layer of uniform thickness.

A more specific object of this invention is to provide a mold fusion fixture assembly suitable for use in joining by alloying one or more bodies of one type of semiconductivity having relatively small planar surfaces to another body of an opposite type of semiconductivity having a relatively larger planar surface, the components being embedded in a compacted comminuted, relatively inert material, wherein a constant compressive load is applied to the bodies during the fusion cycle to provide a uniform wetting of the adjoining planar surfaces to obtain an alloyed layer of uniform thickness.

For a better understanding of the nature and objects of the present invention reference should be had to the following detailed description and drawing in which:

FIGURE 1 is a vertical cross-section through a preferred through a preferred embodiment of a fixture assembly in accordance with the teaching of this invention.

Briefly, the present invention accomplishes the above-cited objects by providing a housing structure for supporting a fusion mold comprising the assembled components of a semiconductor device embedded in a comminuted material wherein the fusion mold is subjected to an initial compressive load applied from a source external to the housing and resilient means disposed within the housing to maintain desired full contact of the assembled components after the external compressive load is released.

Referring to FIG. 1 there is shown a housing structure 10 comprising a cup member 12 and a cap member 14 threadedly engaged with each other. The cap member comprises a top wall 16 and an annular wall 18. The cup member is formed with a bottom wall 20 and an annular wall 22. The bottom wall 20 is preferably provided with a number of spaced bores 24 to permit gases to escape. The inside diameter of the annular wall 18 is substantialy the same as the outside diameter of annular wall 22. The inner surface of annular wall 18 and the outer surface of annular wall 22 are provided with engageable threaded surfaces to permit the cap member 14 to be screwed onto the cup member 12 to form a closed housing. A plunger 26 having a flat head portion 28 and a stem portion 30 is disposed within the housing, the flat head portion 28 having a diameter slightly less than the inside diameter of the annular wall 22, while the stem portion 26 extends through an axially aligned aperture 32 in top wall 16. Within the cup member 12 is placed a hard graphite disk 34, the assembled semiconductor device or devices 36 disposed on the surface of disk 34, a powdered graphite layer 38 (which may be originally pre-pressed to form a soft graphite disk) is disposed above the devices 36, a hard graphite plug 40 and a superimposed metallic spacer disk 42 are placed on top of layer 38, and a spring 44 capable of maintaining its elasticity at the mold fusion temperature is disposed on molybdenum disk 42.

In assembling the fixture for the fusion furnace, the hard graphite disk 34 is inserted first, with a film of oil on its upper surface, and the loosely assembled semiconductor devices 36 are then positioned thereon with the oil film holding them in place. One or more of such devices may be loaded into the cup member depending on their size and the area of the cup member. The graphite layer 38 is then placed over the semiconductor units followed by the hard graphite plug 40, the spacer 42, and the spring 44. The cap member 14 with the plunger 26 loosely attached is then screwed onto the cup member for a few turns so as to properly align the two members. The entire fixture thus assembled is then placed in a press and a pressure of approximately 100 to 600 p.s.i. is applied to the plunger for a few minutes to allow sufficient time for the powdered graphite layer 38 to flow around devices 36. Thereby a uniform dense layer of powdered graphite embeds the devices and maintains them in proper relationship. It will be noted that the external compressive load applied is transmitted to the powdered material from plunger 26 through spring 44 by placing the spring under compression. The initial pressure on the fusion mold should be of the order of 100 p.s.i.—i.e., it may be as little as 100 p.s.i. and up to 1000 p.s.i. A pressure of the order of 5 to 25 p.s.i. is maintained throughout the heating and alloying cycle.

After the fusion mold has been assembled and spring 44 placed under initial compression by plunger 26, the cup member 14 is screwed down with an external load being applied so that the bottom surface of top wall 16 abuts against the top surface of head portion 28 to apply a moderate pressure upon the plunger 26 and thereby maintaining the compressed spring 44 in a state of compression. The cup member 14 can be screwed down finger tight or with a torque wrench applied to nut 46 disposed on the cap member.

When the external press is released, the tendency toward relaxation of the comminuted material forming the fusion mold is prevented by the compressed state of the spring to assure full contact between the adjoining surfaces of the semiconductor components. Furthermore, sufficient force is available in the spring to compensate further for any additional relaxation of the fusion mold components during the fusion cycle as a result of the evaporation of the thin oil film often present between the surfaces to be alloyed.

The housing members may be constructed of any suitable metal such as most steels which are capable of withstanding temperatures up to 800° C., or possibly higher, depending on the material of the semiconductor components to be alloyed. The threaded surfaces formed on the engageable annular members need extend only a short distance, sufficient to permit the cup member to engage the plunger when the external compressive load is applied and should be of a fit to prevent freezing of the members during the fusion cycle. A Class B fit has been found to be suitable. As an additional measure for preventing freezing, the threads can be lapped, for instance with an extremely fine aluminum oxide abrasive, and lubricated with graphite before use.

Any suitable biasing means can be employed within the housing to compensate for the displacement caused by the relaxation of the comminuted material. It is necessary that any such means be capable of withstanding temperatures up to 800° C. or slightly higher and that the stored energy available will produce a force at least equal to and preferably greater than the expansive force caused by the relaxation. Leaf springs or helical springs are especially suitable and quite practical. Springs of high temperature nickel alloys and molybdenum may be used successfully. Other metallic components of the fixture assembly including the plunger and any number of spacer disks can be constructed of similar metals.

While there has been shown and described what is at present considered to be the preferred embodiment of the invention, modifications thereto will readily occur to those skilled in the art. It is not desired, therefore, that the invention be limited to the specific arrangement shown and described, and it is intended to cover in the appended claims all such modifications as fall within the true spirit and scope of the invention.

I claim as my invention:

1. A fixture assembly for maintaining the separate components of a semiconductor device in contiguous relation for the fusing thereof into a unitary body comprising, a cup member, a cap member, said cup member having a bottom wall and an annular side wall, said cap member having a top wall and an annular side wall, the outside diameter of the annular side wall of the cup member being equal to the inside diameter of the annular side wall of the cap member, screw threads disposed on the top outer periphery of the annular side of the cup member and the lower inside periphery of the annular side of the cap member, said screw threads being cooperatively engageable whereby the cap member is joined onto the cup member, the top surface of the cap member having an aperture centrally disposed therein, a plunger, said plunger having a stem portion and a flat head portion, said stem portion extending through said aperture, said flat head portion being disposed within the cavity defined by the walls of the cap member and cup member when they are joined by said cooperatively engaged threads, an inverted U shaped spring disposed within the cavity formed by the walls of the cup and cap member, a first spacer disk having a top and a bottom surface disposed within the cavity defined by the walls of the cap member and cup member, the vertex of said inverted U shaped spring being in contact with the flat head portion of the plunger and the ends of the two legs of the inverted U shaped spring being in contact with the upper surface of the spacer disk, a second disk having a top and a bottom surface disposed within the cavity defined by the walls of the cup and cap member, the bottom surface of said disk being in contact with the bottom wall of the cup member, the first disk, the second disk and the annular wall of the cup member defining a cavity into which is placed the components of a semiconductor device, and at least one bore passing through the bottom wall of the cup member.

2. A fixture assembly for maintaining the separate components of a semiconductor device in contiguous relation for the fusing thereof into a unitary body comprising a hollow cylindrical cup member, a hollow cylindrical cap member, the outside diameter of the cup member being equal to the inside diameter of the cap member, cooperatively engageable thread means for joining said cap member and said cup member, the top surface of the cap member having an aperture centrally disposed therein, a plunger, said plunger having a stem portion and a flat head portion, said stem portion extending through said aperture, and said flat head portion being disposed within the cavity defined by the walls of the cap member and cup member when they are joined by said cooperatively engaged threads, a spring member disposed within the cavity formed by joining the cap member and the cup member, a first spacer disk having a top and a bottom surface disposed within the cavity, one end of said spring member being in contact with the flat head portion of the plunger and the other end being in contact with the upper surface of the spacer disk, a second disk having a top and a bottom surface disposed within the cavity defined by the walls of the cap member and cup member below the first spacer disk, the first disk, the second disk and the annular wall of the cup member defining a cavity into which is placed components of a semiconductor device.

3. A fixture assembly for maintaining the separate components of a semiconductor device in contiguous relation for the fusing thereof into a unitary body comprising a hollow cylindrical cup member, a hollow cylindrical cap member, cooperatively engageable thread means for joining said cap member and said cup member, a plunger, said plunger having a stem portion and a flat head portion, said stem portion extending through an aperture in the top surface of the cap member, the flat head portion of the plunger being disposed within the cavity defined by the walls of the cap member and cup member when they are joined by said cooperatively engaged threads, a spring member disposed within the cavity, a first spacer disk having a top and bottom surface disposed within the cavity defined by the walls of the cap member and cup member, one end of said spring member being in contact with the flat head portion of the plunger and the other end being in contact with the upper surface of the spacer disk, a second disk having a top and a bottom surface disposed within the cavity defined by the walls of the cap member and cup member below said first spacer disk, the first disk, the second disk and the annular wall of the cup member define a cavity into which is placed the components of a semiconductor device.

References Cited in the file of this patent

UNITED STATES PATENTS

| | | |
|---|---|---|
| 2,306,291 | Alons | Dec. 22, 1942 |
| 2,310,841 | Curtis | Feb. 9, 1943 |
| 2,527,150 | Quinlan | Oct. 24, 1950 |
| 2,614,516 | Soderman | Oct. 21, 1952 |
| 2,945,285 | Jacobs | July 19, 1960 |
| 2,960,419 | Emeis | Nov. 15, 1960 |
| 3,009,840 | Emeis | Nov. 21, 1961 |